United States Patent
Sawauchi et al.

(10) Patent No.: US 8,202,955 B2
(45) Date of Patent: Jun. 19, 2012

(54) AQUEOUS FLUORINE-CONTAINING POLYMER DISPERSION

(75) Inventors: Chie Sawauchi, Settsu (JP); Nobuhiko Tsuda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 592 days.

(21) Appl. No.: 12/307,172

(22) PCT Filed: Jul. 5, 2007

(86) PCT No.: PCT/JP2007/063443
§ 371 (c)(1),
(2), (4) Date: Dec. 31, 2008

(87) PCT Pub. No.: WO2008/004614
PCT Pub. Date: Jan. 10, 2008

(65) Prior Publication Data
US 2009/0286932 A1  Nov. 19, 2009

(30) Foreign Application Priority Data
Jul. 6, 2006  (JP) .................................. 2006-186681

(51) Int. Cl.
*C08F 259/08* (2006.01)
*C08F 2/30* (2006.01)

(52) U.S. Cl. .......... 526/255; 523/201; 524/81; 524/458; 524/546

(58) Field of Classification Search .................. 526/255; 523/201; 524/81, 458, 546
See application file for complete search history.

(56) References Cited

U.S. PATENT DOCUMENTS

| | | | |
|---|---|---|---|
| 4,369,266 A | 1/1983 | Kuhls et al. | |
| 6,841,594 B2 | 1/2005 | Jones et al. | |
| 7,358,296 B2 | 4/2008 | Bladel et al. | |
| 7,468,403 B2 | 12/2008 | Nakatani et al. | |
| 2003/0129400 A1 | 7/2003 | Jones et al. | |
| 2006/0148973 A1* | 7/2006 | Malvasi et al. | ............... 524/544 |
| 2007/0208131 A1 | 9/2007 | Tsuda et al. | |
| 2008/0020159 A1 | 1/2008 | Taira et al. | |

FOREIGN PATENT DOCUMENTS

| | | |
|---|---|---|
| EP | 1 364 972 A1 | 11/2003 |
| EP | 1364972 A1 * | 11/2003 |
| EP | 1 452 571 A1 | 9/2004 |
| EP | 1 538 177 A1 | 6/2005 |
| EP | 1 574 527 A1 | 9/2005 |
| EP | 1 676 868 A1 | 7/2006 |
| EP | 1 702 932 A1 | 9/2006 |
| JP | 55-120630 A | 9/1980 |
| JP | 2001-288227 A | 10/2001 |
| JP | 2002-532583 A | 10/2002 |
| JP | 2005-320501 A | 11/2005 |
| WO | 2004/050719 A1 | 6/2004 |
| WO | 2006-054612 A1 | 5/2006 |

* cited by examiner

*Primary Examiner* — Kelechi Egwim
(74) *Attorney, Agent, or Firm* — Sughrue Mion, PLLC

(57) ABSTRACT

The present invention provides an aqueous fluoropolymer dispersion having good mechanical characteristics and storage stability and containing substantially no fluorinated surfactant. The present invention is related to an aqueous fluoropolymer dispersion comprising a dispersed fluoropolymer particle with an average primary particle diameter of 50 to 400 nm, a surface layer of the dispersed fluoropolymer particle being obtained by emulsion polymerization of a monomer composition consisting of 99.999 to 98 mole percent of tetrafluoroethylene and 0.001 to 2 mole percent of a modifier monomer, a fluorinated surfactant content being not higher than 50 ppm, a fluoropolymer content being 20 to 75% by mass, and a nonfluorinated nonionic surfactant content being 2 to 15% by mass relative to 100% by mass of the fluoropolymer.

5 Claims, No Drawings

AQUEOUS FLUORINE-CONTAINING POLYMER DISPERSION

TECHNICAL FIELD

The present invention relates to an aqueous fluoropolymer dispersion.

BACKGROUND ART

Aqueous polytetrafluoroethylene-based fluororesin dispersions, when applied by such a method as coating or impregnation, can form films excellent in such characteristics as chemical stability nonstickiness and weathering resistance and therefore have been widely used in such fields of application as cooking utensils, pipe linings and impregnated glass cloths.

In such fields of application, it is preferable that the aqueous fluororesin dispersions should be high in fluororesin concentration; therefore, they are generally used after concentration following polymerization of a fluoromonomer or fluoromonomers in an aqueous medium in the presence of a fluorinated surfactant. However, in recent years, it has been desired that the content of the fluorinated surfactant in the products should be reduced.

The so-far proposed method of removing a fluorinated surfactant from an aqueous fluororesin dispersion comprises repeating a plurality of times the procedure comprising warming the dispersion in the presence of a nonionic surfactant for causing phase separation, separating the supernatant and recovering the lower phase (Patent Document 1), bringing the dispersion into contact with an anion exchange resin in the presence of a nonionic surfactant to thereby remove the fluorinated surfactant (Patent Document 2) or removing the fluorinated surfactant using an ultrafiltration membrane (Patent Document 3), for instance.

However, the dispersions deprived of the fluorinated surfactant by the methods mentioned above are insufficient in mechanical stability and, therefore, when exposed to mechanical shear on the occasion of transportation or processing thereof, they readily allow the formation of polymer coagula. Since they are also insufficient in storage stability, another problem arises: when they are stored standing, sludge is formed on the container bottom with the lapse of time.

Further, a PTFE dispersion in which each particle comprises a high-molecular-weight core and low-molecular-weight shell has been proposed as a method of improving the stability of the dispersion (Patent Document 4). However, any PTFE dispersion having a core-shell structure and containing substantially no fluorinated surfactant is unknown in the art.

Patent Document 1: International Publication WO 2004/050719
Patent Document 2: Japanese Kohyo (Laid open under PCT) Publication 2002-532583
Patent Document 3: Japanese Kokai Publication S55-120630
Patent Document 4: U.S. Pat. No. 6,841,594

DISCLOSURE OF INVENTION

Problems which the Invention is to Solve

In view of the state of the art discussed above, it is an object of the present invention to provide an aqueous fluoropolymer dispersion having good mechanical characteristics and storage stability and containing substantially no fluorinated surfactant.

Means for Solving the Problems

The present invention provides an aqueous fluoropolymer dispersion comprising a dispersed fluoropolymer particle with an average primary particle diameter of 50 to 400 nm, a surface layer of the dispersed fluoropolymer particle being obtained by emulsion polymerization of a monomer composition consisting of 99.999 to 98 mole percent of tetrafluoroethylene and 0.001 to 2 mole percent of a modifier monomer, a fluorinated surfactant content being not higher than 50 ppm, a fluoropolymer content being 20 to 75% by mass, and a nonfluorinated nonionic surfactant content being 2 to 15% by mass relative to 100% by mass of the fluoropolymer.

The dispersed fluoropolymer particle preferably has a core-shell structure, and a shell is preferably obtained by emulsion polymerization of the monomer composition consisting of 99.999 to 98 mole percent of tetrafluoroethylene and 0.001 to 2 mole percent of the modifier monomer.

The modifier monomer is preferably hexafluoropropylene.

The present invention also provides an aqueous fluoropolymer dispersion comprising a dispersed fluoropolymer particle with an average primary particle diameter of 50 to 400 nm, a surface layer of the dispersed fluoropolymer particle being obtained by emulsion polymerization of a tetrafluoroethylene-containing monomer composition in the presence of a chain transfer agent, a fluorinated surfactant content being not higher than 50 ppm, a fluoropolymer content being 20 to 75% by mass, and a nonfluorinated nonionic surfactant content is 2 to 15% by mass relative to 100% by mass of the fluoropolymer.

The dispersed fluoropolymer particle preferably has a core-shell structure, and a shell is preferably obtained by emulsion polymerization of the tetrafluoroethylene-containing monomer composition in the presence of the chain transfer agent.

The chain transfer agent is preferably ethane and/or methanol.

The nonfluorinated nonionic surfactant is preferably a compound having no benzene ring in a hydrophobic group.

In the following, the invention is described in detail.

The aqueous fluoropolymer dispersion according to the invention is a fluoropolymer dispersion having a specific surface layer, so that it shows good mechanical stability and storage stability even though it is substantially free of any fluorinated surfactant.

The aqueous fluoropolymer dispersion according to the invention is an emulsion obtained by emulsion polymerization for producing a fluoropolymer (polytetrafluoroethylene [PTFE] or modified polytetrafluoroethylene [modified PTFE]) constituting the surface layer and other portion. The above-mentioned aqueous fluoropolymer dispersion comprises the particle obtained by emulsion polymerization and dispersed in the above-mentioned aqueous medium under the action of a fluorinated surfactant. Thus, the above-mentioned aqueous fluoropolymer dispersion is a dispersion comprising the above-mentioned dispersed fluoropolymer particle as the dispersoid, the fluorinated surfactant as the dispersant, and the aqueous medium as the dispersion medium.

The aqueous fluoropolymer dispersion of the invention comprises a dispersed fluoropolymer particle having an average primary diameter of 50 to 400 nm. When the average primary particle diameter is smaller than 50 nm, the dispersion will have an increased viscosity and the processability thereof will be impaired. When it is larger than 400 nm, the stability of the dispersion will be impaired. The average primary particle diameter is preferably 150 to 350 nm.

The above-mentioned average primary particle diameter is the value determined by measuring the transmittance, per unit length, of projected light at the wavelength of 550 nm through an aqueous dispersion diluted with water to a fluoropolymer concentration of 0.22% by mass and comparing the measurement result with a working curve showing the relation between the average primary particle diameter and the above transmittance as obtained in advance by measurements of diameters in a certain direction on transmission electron photomicrographs.

The surface layer of the dispersed fluoropolymer particle is obtained by polymerizing a monomer composition consisting of 99.999 to 98 mole percent of tetrafluoroethylene and 0.001 to 2 mole percent of a modifier monomer or by polymerizing a tetrafluoroethylene-based monomer composition in the presence of a chain transfer agent. In this manner, the aqueous fluoropolymer dispersion can acquire good mechanical stability and storage stability even though it is substantially free of any fluorinated surfactant.

The above-mentioned "surface layer" means the part constituting a predetermined thickness from the surface of the above-mentioned each dispersed fluoropolymer particle toward the particle inside. The dispersed fluoropolymer particle is not particularly restricted provided that at least the surface layer thereof is made of a fluoropolymer (PTFE, modified PTFE) obtained from the monomer composition mentioned above; the resin constituting the inside thereof is not particularly restricted. As dispersed fluoropolymer particle having such a structure, there may be mentioned, for example, particle having a core-shell structure in addition to those resin particle having a single constitution. In that case, the surface layer corresponds to the shell of the dispersed particle having a core-shell structure.

The core-shell structure mentioned above is a conventional structure known in the art and is a structure of primary particles in an aqueous dispersion that can be produced by the method described in U.S. Pat. No. 6, 841,594, for instance. For example, the core (PTFE or modified PTFE) is first produced by polymerization of tetrafluoroethylene [TFE], if necessary together with a modifier monomer, and the shell (PTFE or modified PTFE) is then produced by polymerizing tetrafluoroethylene, together with a modifier monomer according to need.

In the practice of the invention, the above-mentioned "core-shell" structure includes all of (1) the one whose core and shell are obtained from different monomer compositions, (2) the one whose core and shell are obtained from one and the same monomer composition and are different in number average molecular weight and (3) the one whose core and shell are obtained from different monomer compositions and are different in number average molecular weight.

As the above-mentioned dispersed fluoropolymer particles having a core-shell structure, there may be mentioned emulsion particles obtained by emulsion polymerization of a monomer composition (monomer composition comprising TFE, if necessary together with a modifier monomer and/or such a nonfluorinated monomer as mentioned later herein) for producing the core and a monomer composition (monomer composition to be used for the production of the surface layer mentioned above) for producing the shell. The emulsion polymerization can be carried out in the conventional manner.

The modifier monomer mentioned above is not particularly restricted provided that it is a polymerizable unsaturated compound containing a carbon atom-bound fluorine atom or atoms and is other than tetrafluoroethylene [TFE]; thus, it includes, for example, fluoroolefins such as hexafluoropropylene [HFP], chlorotrifluoroethylene [CTFE] and trifluoroethylene; fluoro(alkyl vinyl ether) species in which the alkyl moiety contains 1 to 5 carbon atoms, in particular 1 to 3 carbon atoms; fluorodioxoles; perfluoroalkylethylenes; and ω-hydroperfluoroolefins, among others. Among them, hexafluoropropylene is preferred from the mechanical stability and storage stability points of view.

When the content of the modifier monomer in the monomer composition from which the shell is to be obtained is lower than 0.001 mole percent, the mechanical stability and storage stability may possibly decrease. At content levels exceeding 2 mole percent, the good chemical resistance, thermal stability and other characteristics intrinsic in PTFE are impaired. Preferably, the modifier monomer content is 0.01 to 1 mole percent.

When the content of TFE in the monomer composition from which the shell is to be obtained is in excess of 99.999 mole percent, the mechanical stability and storage stability may possibly decrease. At content levels lower than 98 mole percent, the good chemical resistance, thermal stability and other characteristics intrinsic in PTFE are impaired. Preferably, the TFE content is 99.99 to 99 mole percent.

The content (mole percent) of the modifier monomer or TFE, so referred to herein, means the mole fraction (mole percent) of the modifier monomer or TFE relative to the total number amount of the monomers from which the shell is to be formed.

The monomer composition mentioned above may contain a nonfluorinated vinyl monomer. The "nonfluorinated vinyl monomer", so referred to herein, is a monomer containing a carbon-carbon double bond and containing no fluorine atom.

Usable as the chain transfer agent mentioned above are, for example, hydrogen; hydrocarbons such as methane, ethane, propane and butane; halogenated hydrocarbons such as $CH_3Cl$, $CH_2Cl_2$ and $CH_2CF_2$; and water-soluble ones such as methanol and ethanol. Those which are gaseous at ordinary temperature and pressure are preferably used under ordinary polymerization conditions to control the molecular weight and molecular weight distribution. As such gaseous chain transfer agent, there may be mentioned hydrogen; hydrocarbons such as methane, ethane propane and butane; and halogenated hydrocarbons such as $CH_3Cl$ and $CH_2CF_2$. Preferred are hydrogen, methane, ethane, propane and methanol; particularly preferred are methane, ethane and methanol. Methane, ethane and methanol function effectively at low addition levels and cause only slight decreases in rate of polymerization, hence they are economically advantageous.

In cases where the emulsion polymerization is carried out in the presence of a chain transfer agent, the content of tetrafluoroethylene in the monomer composition is preferably 98 to 100 mole percent. At such content levels, good mechanical stability and storage stability can be obtained. The content is more preferably 99 to 100 mole percent.

The shell obtained by emulsion polymerization is made of a tetrafluoroethylene homopolymer [TFE homopolymer] or modified polytetrafluoroethylene [modified PTFE]. Such a fluoropolymer makes it possible to attain high fluorinated surfactant removing efficiency. The term "modified PTFE" as used herein means the product obtained by copolymerizing TFE with a trace amount of a monomer (modifier monomer) other than TFE in an amount at which the fluoropolymer obtained will show no melt-flow characteristics.

The shell obtained by emulsion polymerization of a monomer composition consisting of 99.999 to 98 mole percent of tetrafluoroethylene and 0.001 to 2 mole percent of a modifier monomer in the presence of a chain transfer agent is particularly preferred as the shell mentioned above. When the shell is such one, further improvements in mechanical stability and storage stability can be achieved.

The core mentioned above is not particularly restricted but may be, for example, made of a fluoropolymer obtained by emulsion polymerization, in the conventional manner, of a monomer composition comprising the above-mentioned TFE, if necessary together with such a modifier monomer and/or nonfluorinated vinyl monomer as mentioned above.

The proportion of the monomer composition constituting the core mentioned above is preferably 50 to 99.9% by mass, more preferably 80 to 99% by mass, still more preferably 90 to 99% by mass, of the total amount (100% by mass) of the core-constituting monomer composition and the shell-constituting monomer composition.

The emulsion polymerization for obtaining the fluoropolymers respectively constituting the above-mentioned shell and core are not particularly restricted provided that a fluorinated surfactant is used; thus, the conventional methods known in the art can be used. As such a conventional method, there may be mentioned, for example, the method comprising carrying out the emulsion polymerization of a fluorinated monomer or monomers, if desired together with a nonfluorinated vinyl monomer, in an aqueous medium in the presence of a fluorinated surfactant, a polymerization stabilizer, a polymerization initiator and the above-mentioned chain transfer agent, among others.

The fluorinated surfactant mentioned above is not particularly restricted provided that it is a fluorine atom-containing surfactant; it may be a nonionic, anionic, cationic or amphoteric surfactant but preferably is the anionic surfactant in view of its great fluoropolymer-dispersing ability.

As the above fluorinated anionic surfactant, there may be mentioned, for example, perfluorocarboxylic acids and/or salts thereof such as perfluorooctanoic acid and/or salts thereof (hereinafter "perfluorooctanoic acid and/or salts thereof" are sometimes collectively referred to as "PFOA" for short); and perfluorooctylsulfonic acid and/or salts thereof (hereinafter "perfluorooctylsulfonic acid and/or salts thereof" are sometimes collectively referred to as "PFOS" for short) and the like. Among them, the perfluorocarboxylic acid and/or the salt thereof is preferred.

In cases where the fluorinated anionic surfactant is in the form of a salt, the counter ion forming the salt is an alkali metal ion or $NH_4^+$, for instance, and the alkali metal ion is, for example, $Na^+$ or $K^+$. $NH_4^+$ is preferred as the counter ion, however. The fluorinated surfactant to be used may comprise one single species or two or more species.

From the ready removability viewpoint, the fluorinated surfactant is preferably one having a number average molecular weight of not higher than 1000, more preferably not higher than 500; it is preferably one containing 5 to 12 carbon atoms. The number average molecular weight, so referred to herein, is the measured value on the polystyrene equivalent basis as measured by GPC (gel permeation chromatography).

The fluorinated surfactant, so referred to herein, is conceptually distinguished from the nonfluorinated nonionic surfactant which is described later herein and is used in removing the fluorinated surfactant, since the former is used in emulsion polymerization.

The polymerization stabilizer mentioned above is not particularly restricted but may be any of those generally used in emulsion polymerization; for example, paraffin species may be mentioned, among others.

The polymerization initiator mentioned above is not particularly restricted but may be any of those generally used in emulsion polymerization; for example, ammonium persulfate and disuccinoyl peroxide may be mentioned, among others.

The polymerization conditions in the emulsion polymerization for obtaining the above-mentioned fluoropolymers can be properly selected according to the fluoropolymer species to be obtained.

The aqueous medium mentioned above is not particularly restricted provided that it is a water-containing liquid; it may contain, in addition to water, a nonfluorinated organic solvent and/or a fluorinated organic solvent, for example an alcohol, ether, ketone or paraffin wax.

The method of producing aqueous fluoropolymer dispersions according to the invention can be carried out by the method which comprises subjecting a raw aqueous fluoropolymer dispersion obtained by any of the emulsion polymerization techniques known in the art (e.g. the method described hereinabove) to treatment with an ion exchange resin as described in Japanese Kohyo Publication 2002-532583 and/or to concentration by phase separation as described in International Publication WO 2004/050719, in the presence of a nonfluorinated nonionic surfactant, for example by adding a nonfluorinated nonionic surfactant to the raw aqueous fluoropolymer dispersion, further adjusting the pH to 7 to 9 and bringing the resulting mixture into contact with an anion exchange resin comprising a strongly basic resin adjusted in advance to an OH form, in a basic environment.

As the above-mentioned nonfluorinated nonionic surfactant is not particularly restricted but any of those fluorine-free, nonionic compound-based ones known in the art may be used. As such nonfluorinated nonionic surfactant, there may be mentioned, for example, ether type nonionic surfactants such as polyoxyethylene alkylphenyl ethers, polyoxyethylene alkyl ethers and polyoxyethylenealkylene alkyl ethers; polyoxyethylene derivatives such as ethylene oxide/propylene oxide block copolymers; ester type nonionic surfactants such as sorbitan fatty acid esters, polyoxyethylenesorbitan fatty acid esters, polyoxyethylenesorbitol fatty acid esters, glycerol fatty acid esters and polyoxyethylene fatty acid esters; amine type nonionic surfactants such as polyoxyethylenealkylamines and alkylalkanolamides; and so forth.

The hydrophobic group in the compound constituting the above-mentioned nonfluorinated nonionic surfactant may be an alkylphenol group, a straight alkyl group or a branched alkyl group but preferably is a benzene ring-free one, for example a compound having no alkylphenol group in the structure thereof.

Preferred as the nonfluorinated nonionic surfactant mentioned above are, among others, polyoxyethylene alkyl ether type nonionic surfactants. Preferred as the polyoxyethylene alkyl ether type nonionic surfactants are those having a polyoxyethylene alkyl ether structure in which the alkyl group contains 10 to 20 carbon atoms, more preferably having a polyoxyethylene alkyl ether structure in which the alkyl group contains 10 to 15 carbon atoms. The alkyl group in the above-mentioned polyoxyethylene alkyl ether structure preferably has a branched structure.

Commercially available as the polyoxyethylene alkyl ether type nonionic surfactants are, for example, Genapol X080 (product name, product of Clariant Corp.), Tergitol 9-S-15 (product name, product of Clariant Corp.), Noigen TDS-80 (product name, product of Daiichi Kogyo Seiyaku Co.) and Leocol TD90 (product name, product of Lion Corp.).

On the occasion when the above-mentioned nonfluorinated nonionic surfactant is added and the treatment with the above-mentioned ion exchange resin is carried out, the level of addition of the nonfluorinated nonionic surfactant is preferably 1 to 40% by mass, more preferably 1 to 30% by mass, still more preferably 1 to 20% by mass, relative to 100% by mass of the dispersed fluoropolymer particles (on the solid matter basis).

When the above-mentioned concentration by phase separation is employed, the concentration can be effected by adding the above-mentioned nonfluorinated nonionic surfactant to the above-mentioned raw aqueous fluoropolymer dispersion to the concentration mentioned above, heating the raw aqueous fluoropolymer dispersion to cause separation into a fluoropolymer-free phase (supernatant phase) and a fluoropolymer-containing phase (concentrated phase) and removing the fluoropolymer-free phase, whereupon the fluoropolymer-containing phase is obtained.

The aqueous fluoropolymer dispersion of the invention has a fluorinated surfactant content of not higher than 50 ppm. While it is desired that the fluorinated surfactant content be reduced as far as possible, as mentioned hereinabove, that content can be reduced to a level not higher than 50 ppm, namely a substantially zero content level, by the above-mentioned method or the like according to the invention. The fluorinated surfactant content is preferably 25 ppm or below, more preferably 5 ppm or below.

The fluorinated surfactant content, so referred to herein, is measured by adding an equal volume of methanol to the aqueous fluoropolymer dispersion sample for causing coagulation, carrying out Soxhlet extraction and subjecting the extract to high-performance liquid chromatography [HPLC].

The aqueous fluoropolymer dispersion of the invention has a fluoropolymer content of 20 to 75% by mass, preferably 30 to 70% by mass, more preferably 50 to 65% by mass.

The fluoropolymer content (P), so referred to herein, is determined by weighing about 1 g (X) of the sample in an aluminum cup with a diameter of 5 cm, drying the same at 100° C. for 1 hours and further at 300° C. for 1 hour and calculating the content based on the residue (Z) on drying according to the equation: $P=Z/X \times 100$ (%).

The nonfluorinated nonionic surfactant content in the aqueous fluoropolymer dispersion of the invention is 2 to 15% by mass relative to 100% by mass of the fluoropolymer in the above-mentioned dispersion. When it is lower than 2% by mass, the aqueous dispersion may possibly be deteriorated in chemical and/or mechanical stability and, when it is in excess of 15% by mass, the aqueous dispersion may show increases in viscosity and may be deteriorated in storage stability. The content is preferably 2 to 10% by mass, more preferably 2 to 6% by mass.

The nonfluorinated nonionic surfactant content (N), so referred to herein, is determined in the following manner. About 1 g (X) of the sample is placed in an aluminum cup with a diameter of 5 cm and heated at 100° C. for 1 hour, the residue on heating (Y g) is further heated at 300° C. for 1 hour, and the content (N) is calculated from the final residue (Z g) on heating according to the equation: $N=[(Y-Z)/Z] \times 100$ (%)

The aqueous fluoropolymer dispersion of the invention, either as such or after addition of one or more of various additives thereto, can be processed into coatings, cast films, impregnated products and so forth.

As the fields of application of the above-mentioned aqueous fluoropolymer dispersion, there may be mentioned, for example, oven inside linings, coatings or coverings on ice-making trays, other cooking utensils, electric wires, pipes, ship bottoms, high-frequency printed circuit boards, conveyer belts and iron sole plates; fibrous substrates, woven fabrics and nonwoven fabrics, among others. The above-mentioned fibrous substrates are not particularly restricted but, for example, glass fibers, carbon fibers and aramid fibers (Kevlar (registered trademark) fibers, etc.) can be impregnated with the dispersion to give impregnated products; etc. The above-mentioned aqueous fluoropolymer dispersion can be processed by the conventional methods known in the art.

EFFECTS OF THE INVENTION

The aqueous fluoropolymer dispersion of the invention has a fluorinated surfactant content not higher than 50 ppm and therefore is desirable as a product. Further, it has good mechanical stability and storage stability in spite of the fact that it contains substantially no fluorinated surfactant.

BEST MODES FOR CARRYING OUT THE INVENTION

The following examples illustrate the present invention in further detail. These examples are, however, by no means limitative of the scope of the invention. In the examples, "part(s)" and "%", unless otherwise specified, represent "part(s) by mass" and "% by mass", respectively.

The measurements in the examples and comparative example were carried out by the following methods.
(1) Fluoropolymer Content (P)

About 1 g (X) of the sample was placed in an aluminum cup with a diameter of 5 cm, dried at 100° C. for 1 hour and further dried at 300° C. for 1 hour and, based on the thus-obtained residue (Z) on heating, the concentration P was calculated as follows: $P=Z/X \times 100$ (%).
(2) Fluorinated Surfactant Content To the aqueous dispersion obtained was added an equal volume of methanol, the mixture was subjected to Soxhlet extraction, and the extract was subjected to high-performance liquid chromatography [HPLC] under the conditions given below. In calculating the fluorinated surfactant concentration, a working curve constructed by subjecting fluorinated surfactant solutions with known concentrations to HPLC measurements using the mobile phase and conditions given below was used.
(Measurement Conditions)
Column: ODS-120T (4.6 φ×250 mm, product of Tosoh Corp.)
Developing solution: Acetonitrile/0.6% aqueous solution of perchloric acid=1/1 (vol/vol %)
Sample size: 20 μL
Flow rate: 1.0 ml/minute
Detection wavelength: UV 210 nm
Column temperature: 40° C.
(3) Nonfluorinated Nonionic Surfactant Content (N) in Aqueous Dispersion About 1 g (X g) of the sample was placed in an aluminum cup with a diameter of 5 cm, heated at 100° C. for 1 hour to give a residue (Y g) on heating, the thus-obtained residue (Y g) on heating was further heated at 300° C. for 1 hour, and the content N was calculated from the thus-obtained residue (Z g) on heating as follows: $N=[(Y-Z)/Z] \times 100$ (%).
(4) Average Primary Particle Diameter of Dispersed Fluoropolymer Particles It was determined by measuring the transmittance, per unit length, of projected light at the wavelength of 550 nm through an aqueous dispersion adjusted to a fluoropolymer concentration of 0.22% by mass and comparing the measurement result with a working curve showing the relation between the average primary particle diameter and the above-defined transmittance as obtained in advance by measurements of diameters in a certain direction on transmission electron photomicrographs.

SYNTHESIS EXAMPLE 1

A 6-liter stainless steel autoclave equipped with a stainless steel anchor impeller and a jacket for temperature adjustment was charged with 2960 ml of deionized water, 100 g of paraffin wax and 4.5 g of ammonium perfluorooctanoate, and the system inside oxygen was removed by three repetitions of a procedure comprising nitrogen gas injection and degassing. Then, TFE gas was fed under pressure until a pressure of 0.74 MPa at 85° C., and the internal temperature was maintained at 85° C. with stirring at 250 rpm.

Then, an aqueous solution prepared by dissolving 477 mg of disuccinoyl peroxide in 20 ml of water was injected with pressurized TFE and, further, an aqueous solution prepared by dissolving 30 mg of ammonium persulfate in 20 ml of water was injected with pressurized TFE. Since the pressure immediately began to lower, the pressure was maintained at 0.78±0.05 MPa with TFE and the reaction was thus continued.

At the time of arrival of the consumption of TFE at 1200 g (core formation), 15 ml of ethane gas was fed as a chain transfer agent and, while TFE was fed continuously, the polymerization was continued to form a shell copolymer. At the time of arrival of the consumption of TFE at 1350 g (at 12 hours after initiation of the reaction), the stirring and TFE feeding were discontinued, the autoclave inside gases were immediately discharged to terminate the reaction, and an aqueous TFE-based polymer dispersion was obtained (fluoropolymer concentration 31% by mass; average primary particle diameter 260 nm).

SYNTHESIS EXAMPLE 2

A 6-liter stainless steel autoclave equipped with a stainless steel anchor impeller and a jacket for temperature adjustment was charged with 2960 ml of deionized water, 100 g of paraffin wax and 4.5 g of ammonium perfluorooctanoate, and the system inside oxygen was removed by three repetitions of a procedure comprising nitrogen gas injection and degassing. Then, TFE gas was fed under pressure until a pressure of 0.74 MPa at 85° C., and the internal temperature was maintained at 85° C. with stirring at 250 rpm.

Then, an aqueous solution prepared by dissolving 477 mg of disuccinoyl peroxide in 20 ml of water was injected with pressurized TFE and, further, an aqueous solution prepared by dissolving 30 mg of ammonium persulfate in 20 ml of water was injected with pressurized TFE. Since the pressure immediately began to lower, the pressure was maintained at 0.78±0.05 MPa with TFE and the reaction was thus continued.

At the time of arrival of the consumption of TFE at 1200 g (core formation), 2 ml of HFP was fed and, while TFE was fed continuously, the polymerization was continued to form a shell copolymer. At the time of arrival of the consumption of TFE at 1350 g (at 11 hours after initiation of the reaction), the stirring and TFE feeding were discontinued, the autoclave inside gases were immediately discharged to terminate the reaction, and an aqueous TFE-based polymer dispersion was obtained (fluoropolymer concentration 31% by mass; average primary particle diameter 262 nm; HFP 0.001 mol %).

SYNTHESIS EXAMPLE 3

The procedure of Synthesis Example 2 was followed in the same manner except that CTFE was used in lieu of HFP; an aqueous TFE-based polymer dispersion was obtained (fluoropolymer concentration 31% by mass; average primary particle diameter 265 nm; CTFE 0.002 mol %).

SYNTHESIS EXAMPLE 4

A 6-liter stainless steel autoclave equipped with a stainless steel anchor impeller and a jacket for temperature adjustment was charged with 2960 ml of deionized water, 100 g of paraffin wax and 4.5 g of ammonium perfluorooctanoate, and the system inside oxygen was removed by three repetitions of a procedure comprising nitrogen gas injection and degassing. Then, TFE gas was fed under pressure until a pressure of 0.74 MPa at 85° C., and the internal temperature was maintained at 85° C. with stirring at 250 rpm.

Then, an aqueous solution prepared by dissolving 477 mg of disuccinoyl peroxide in 20 ml of water was injected with pressurized TFE and, further, an aqueous solution prepared by dissolving 30 mg of ammonium persulfate in 20 ml of water was injected with pressurized TFE. Since the pressure immediately began to lower, the pressure was maintained at 0.78±0.05 MPa with TFE and the reaction was thus continued.

At the time of arrival of the consumption of TFE at 1200 g (core formation), 1 ml of HFP and 0.5 mL of methanol were fed and, while TFE was fed continuously, the polymerization was continued to form a shell copolymer. At the time of arrival of the consumption of TFE at 1350 g (at 11 hours after initiation of the reaction), the stirring and TFE feeding were discontinued, the autoclave inside gases were immediately discharged to terminate the reaction, and an aqueous TFE-based polymer dispersion was obtained (fluoropolymer concentration 31% by mass; average primary particle diameter 262 nm; HFP 0.001 mol %).

EXAMPLE 1

(1) Ion Exchange Resin Treatment

A 5% aqueous solution (150 mL) of a nonfluorinated nonionic emulsifier, Leocol TD90 (trade name, product of Lion Corp.), was passed, over 30 minutes, through a column (3 cm in diameter, 20 cm in height) packed with 150 mL of an OH-form anion exchange resin, Amberjet IRA4002OH (trade name, product of Rohm and Haas).

To the aqueous dispersion obtained in Synthesis Example 1 was added Leocol TD90 to a concentration of 5% relative to the fluoropolymer and, after thorough mixing, 600 mL of this aqueous dispersion was passed through the column at 25° C. over 2 hours (space velocity (SV)=2). The PFOA concentration in the thus-obtained aqueous TFE-based polymer dispersion was below the detection limit (10 ppm).

(2) Concentration by Phase Separation

Leocol TD90 was further added to the aqueous TFE-based polymer dispersion obtained by the ion exchange resin treatment in Example 1 to make the Leocol TD90 concentration 20% relative to the fluoropolymer and, after uniformly mixing at 40° C., the resulting mixture was allowed to stand in a one-liter glass vessel at 70° C. for 16 hours, whereupon it separated into two phases, namely the substantially fluoropolymer-free supernatant phase and the concentrated phase. The supernatant phase was removed and the concentrated phase was recovered; thus, an aqueous fluoropolymer dispersion having a fluoropolymer concentration of 65% and a nonfluorinated nonionic surfactant concentration of 3.6% relative to the fluoropolymer was obtained.

Leocol TD90 and water were added to this aqueous dispersion to give an aqueous dispersion having a solid matter concentration (fluoropolymer concentration) of 60% and a nonfluorinated nonionic surfactant concentration of 5% relative to the fluoropolymer.

The mechanical stability of this aqueous dispersion was evaluated by the following method: the aggregate percentage was 0.8%.

Mechanical stability: Using a tubular pump connected to a Tygon tube with an outside diameter of 7.9 mm and an inside diameter of 4.8 mm, 100 ml of the dispersion was circulated at 35° C. at a rate of 200 ml/min for 1 hour. After completion of the circulation, the aggregate was collected using a 200-mesh stainless steel wire net, washed with water and then dried at 120° C. for 1 hour, the residue was weighed, and the mass proportion thereof relative to the polymer initially contained in the dispersion subjected to testing was calculated.

The storage stability was evaluated by the method given below; after 1-month standing at 40° C., the aggregate percentage was 2%.

Storage stability: A 500-g portion of the dispersion was placed in a 500-ml plastic bottle, and the whole was allowed to stand in a constant-temperature vessel at 40° C. for 1 month. After standing, the dispersion was stirred at room temperature using a table ball mill, the aggregate was then collected using a 200-mesh stainless steel wire net, washed with water and dried at 120° C. for 1 hour, the residue was weighed, and the mass proportion thereof relative to the polymer initially contained in the dispersion subjected to testing was calculated.

EXAMPLE 2

Ion exchange resin treatment was carried out in the same manner as in Example 1 except that the aqueous dispersion obtained in Synthesis Example 2 was used in lieu of the aqueous dispersion of Synthesis Example 1. The PFOA concentration in the aqueous TFE-based polymer dispersion obtained was below the detection limit.

Then, concentration by phase separation was carried out in the same manner as in Example 1, whereupon an aqueous fluoropolymer dispersion with a fluoropolymer concentration of 68% and a nonfluorinated nonionic surfactant concentration of 3.3% relative to the fluoropolymer was obtained.

Leocol TD90 and water were added to this aqueous dispersion to give an aqueous dispersion having a solid matter concentration (fluoropolymer concentration) of 60% and a nonfluorinated nonionic surfactant concentration of 5% relative to the fluoropolymer.

The mechanical stability of this aqueous dispersion was measured: the aggregate percentage was 0.9%.

The aggregate percentage after 1 month of standing at 40° C. was 2%.

EXAMPLE 3

Ion exchange resin treatment was carried out in the same manner as in Example 1 except that the aqueous dispersion obtained in Synthesis Example 3 was used in lieu of the aqueous dispersion of Synthesis Example 1. The PFOA concentration in the aqueous TFE-based polymer dispersion obtained was below the detection limit.

Then, concentration by phase separation was carried out in the same manner as in Example 1, whereupon an aqueous fluoropolymer dispersion with a fluoropolymer concentration of 70% and a nonfluorinated nonionic surfactant concentration of 3.1% relative to the fluoropolymer was obtained.

Leocol TD90 and water were added to this aqueous dispersion to give an aqueous dispersion having a solid matter concentration (fluoropolymer concentration) of 60% and a nonfluorinated nonionic surfactant concentration of 5% relative to the fluoropolymer.

The mechanical stability of this aqueous dispersion was measured: the aggregate percentage was 1.5%.

The aggregate percentage after 1 month of standing at 40° C. was 4%.

EXAMPLE 4

Ion exchange resin treatment was carried out in the same manner as in Example 1 except that the aqueous dispersion obtained in Synthesis Example 4 was used in lieu of the aqueous dispersion of Synthesis Example 1. The PFOA concentration in the aqueous TFE-based polymer dispersion obtained was below the detection limit.

Then, concentration by phase separation was carried out in the same manner as in Example 1, whereupon an aqueous fluoropolymer dispersion with a fluoropolymer concentration of 64% and a nonfluorinated nonionic surfactant concentration of 3.5% relative to the fluoropolymer was obtained.

Leocol TD90 and water were added to this aqueous dispersion to give an aqueous dispersion having a solid matter concentration (fluoropolymer concentration) of 60% and a nonfluorinated nonionic surfactant concentration of 5% relative to the fluoropolymer.

The mechanical stability of this aqueous dispersion was measured: the aggregate percentage was 0.6%.

The aggregate percentage after 1 month of standing at 40° C. was 2%.

COMPARATIVE EXAMPLE 1

The polymerization procedure in Example 1 was followed in the same manner except that the feeding of ethane gas was omitted and the monomer amount fed was 1350 g; a dispersion with a fluoropolymer concentration of 30.7% by mass and an average primary particle diameter of 285 nm was obtained.

The result of mechanical stability testing was 3.0%, and the result of storage stability testing was 6%.

Industrial Applicability

The aqueous fluoropolymer dispersion of the invention can suitably be used in such fields of application as cooking utensils, pipe linings and impregnated glass cloth membranes.

The invention claimed is:
1. An aqueous fluoropolymer dispersion comprising a dispersed fluoropolymer particle with an average primary particle diameter of 50 to 400 nm,
   a surface layer of the dispersed fluoropolymer particle being obtained by emulsion polymerization of a monomer composition consisting of 99.999 to 98 mole percent of tetrafluoroethylene and 0.001 to 2 mole percent of a modifier monomer,
   a fluorinated surfactant content being not higher than 50 ppm,
   a fluoropolymer content being 20 to 75% by mass, and
   a nonfluorinated nonionic surfactant content being 2 to 15% by mass relative to 100% by mass of the fluoropolymer,
   wherein the dispersed fluoropolymer particle has a core-shell structure, and
   the shell is obtained by emulsion polymerization of the monomer composition consisting of 99.999 to 98 mole percent of tetrafluoroethylene and 0.001 to 2 mole percent of the modifier monomer, and
   wherein the core and the shell are obtained from different monomer compositions, or the core and the shell are obtained from different monomer compositions and are different in number average molecular weight.

2. The aqueous fluoropolymer dispersion according to claim 1,
wherein the modifier monomer is hexafluoropropylene.

3. The aqueous fluoropolymer dispersion according to claim 1,
wherein the nonfluorinated nonionic surfactant is a compound having no benzene ring in a hydrophobic group.

4. The aqueous fluoropolymer dispersion according to claim 2,
wherein the nonfluorinated nonionic surfactant is a compound having no benzene ring in a hydrophobic group.

5. The aqueous fluoropolymer dispersion according to claim 1,
wherein the aqueous fluoropolymer dispersion has a fluoropolymer content of 50 to 65% by mass.

* * * * *